UNITED STATES PATENT OFFICE.

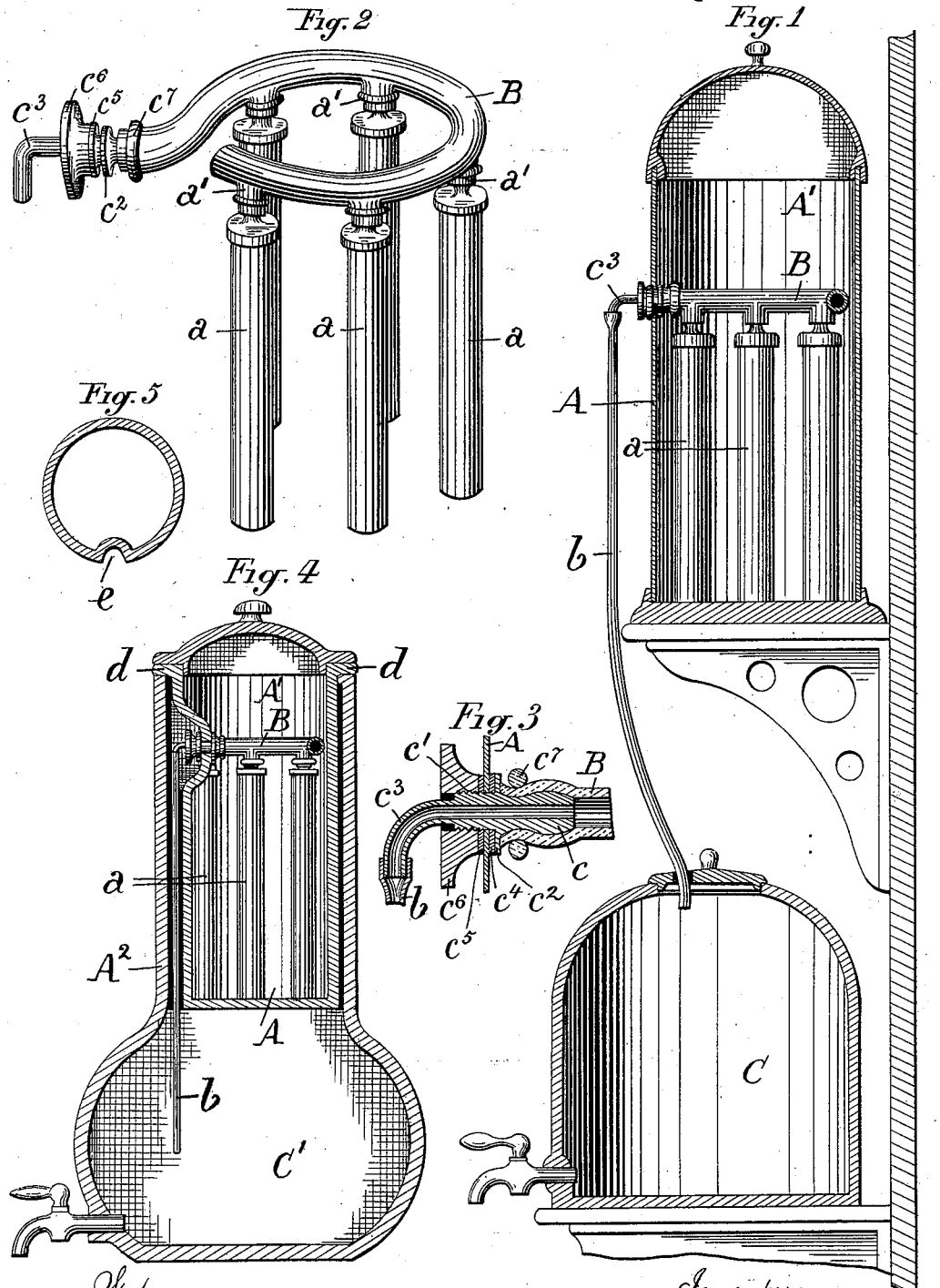
(No Model.)
C. E. CHAMBERLAND.
FILTER.
No. 602,304.    Patented Apr. 12, 1898.
Witnesses
A. N. Dobson
G. P. Kramer
Inventor
Charles Edouard Chamberland
By Fadler Freeman
Attorneys

CHARLES EDOUARD CHAMBERLAND, OF PARIS, FRANCE.

FILTER.

SPECIFICATION forming part of Letters Patent No. 602,304, dated April 12, 1898.

Application filed August 30, 1892. Serial No. 444,549. (No model.) Patented in France September 13, 1890, No. 208,236.

*To all whom it may concern:*

Be it known that I, CHARLES EDOUARD CHAMBERLAND, a citizen of the Republic of France, residing at Paris, France, have invented certain new and useful Improvements in Filters, (for which I have received a patent in France September 13, 1890, No. 208,236,) of which the following is a specification.

My invention relates to improvements in filters, and especially to that class of filters which employ porous earthenware as a filtering medium and operate under what is known as the "system Pasteur."

The especial object of my invention is to provide a filter operating under the system Pasteur, which is especially adapted for places where pressure from waterworks or otherwise is not available.

My invention consists in the various constructions and combinations of parts hereinafter described, and pointed out in the claims.

In the accompanying drawings, Figure 1 is a sectional elevation of a device embodying my invention. Fig. 2 is a perspective view of the filtering-tubes and the collector therefor in detail. Fig. 3 is a sectional detail view of some of the parts of the same. Fig. 4 is a sectional elevation showing a modification. Fig. 5 is a sectional view in detail of a portion of the same.

Like parts are represented by similar letters of reference in the several views.

In the said drawings, A represents a suitable receptacle which may be of any suitable or convenient form or size.

$a\ a$, &c., are the filtering-tubes, preferably of the well-known form now in common use in filters of this character. These filtering-tubes $a\ a$ are connected to a collector B, preferably of rubber and provided with a series of projecting nipples or necks $a'$, into which the projecting nipples of the tube are adapted to be inserted, so as to establish a communication from the interior of the tube to the interior of the collector. The collector is provided with as many necks $a'$ as there are tubes to be used in the filter. The collector B is closed at one end and attached at the other end by a suitable connection to a short tube or pipe section $c$, which passes through the wall of the receptacle A and is connected to a flexible tube $b$, preferably of rubber, which extends downwardly to any suitable distance below the receptacle A and discharges into the reservoir C.

The receptacle A is preferably made of sufficient length so that a chamber $A'$ is formed above the collector B, and thus above the tubes $a$, adapted to be filled with water or other liquid to be filtered, and thus form a slight pressure on the tubes in starting, which will cause the liquid to pass through the walls of the tube into the collector and thence out the flexible discharge-tube $b$ and into the reservoir C or to any other point of discharge. The filtering having been once started the flexible tube $b$, being extended below the bottom of the filtering-tubes $a$, acts as a siphon to cause the water to be drawn from the casing A as long as any water remains therein, the porous tubes remaining filled at all times, thus preventing the passage of air through the walls of the same, so that the filtering may continue when once started until all the water from the receptacle A has been removed.

For convenience in connecting the collector and to permit the same to be removed for cleaning the tubes or otherwise I preferably employ a short tube or pipe connection which consists, essentially, of a metallic nipple $c$, Fig. 3, adapted to receive the open end of the collector, which is slipped over the same, the nipple being provided with a screw-threaded portion $c'$ and a flange $c^2$, the screw-threaded portion $c'$ being extended in the form of a curved tube $c^3$, to which the flexible tube $b$ is connected.

In assembling the device a washer $c^4$, of packing material, is placed around the screw-threaded portion $c'$ and against the flange $c^2$. The curved tube $c^3$ is inserted through an opening provided in the side of the receptacle A from the inside until the packing-ring $c^4$ comes against the inside of the wall of the receptacle. Another packing-washer $c^5$ is placed on the screw-threaded portion of the outside of the casing A and an internally-screw-threaded nut $c^6$ passed over the curved portion $c^3$ and turned onto the screw-threaded portion $c'$ until the parts are firmly clamped together on opposite sides of the wall of the receptacle A, thus forming a perfect joint through the wall of said receptacle and a convenient device for connecting the flexible tube b and the collector B.

$c^7$ is an elastic ring securing a tight joint between B and c.

In Fig. 4 I have shown the receptacle A inclosed within an outer casing $A^2$, at the bottom of which is formed a reservoir C', the flexible tube b being adapted to extend downwardly inside the casing $A^2$ into the reservoir C'. The receptacle A is preferably provided at the top with suitable projection flanges d to rest on the top of the casing A. When thus constructed, the receptacle A is preferably provided at one side with a groove or depression e, (see Fig. 5 for detail,) adapted to receive the flexible tube b and permit the same to pass downwardly into the reservoir C'.

By the construction and arrangement of parts thus described a filter is secured which is very simple in its construction and operation. By the use of the extended discharge-tube b the atmospheric pressure is utilized for filtering purposes, the amount of pressure secured depending on the length of the tube. By the arrangement of the casing A with the auxiliary chamber or reservoir A' above the point of discharge from the filtering-tubes means are provided by which the filter is started and the siphon action of the discharge-tube b secured without the necessity of priming the tube b by artificial means.

It is obvious that the constructions herein shown and described may be variously modified without departing from the spirit of my invention. I do not, therefore, limit myself to the exact constructions shown and described; but

I claim as my invention—

1. In a filter, the combination with a flexible collector having extended necks as described, of a series of filtering-tubes adapted to be connected into said necks, said collector being adapted to be connected through the walls of a retaining-receptacle to a discharge-tube which is extended below the bottom of said filtering-tubes, substantially as specified.

2. The combination with an outer casing, an inner receptacle or filtering-chamber supported within and in the upper part of said outer casing so as to form a reservoir in the lower part of said casing and below said inner receptacle, a series of filtering-tubes within said filtering-chamber, a discharge-pipe extending through the walls of said filtering-chamber, and a connection from said discharge-pipe to a collector with which said filtering-tubes are connected, said discharge-pipe being adapted to discharge into the reservoir in the bottom of said casing, substantially as specified.

3. In a filter, the combination with a retaining-receptacle, and one or more filtering-tubes arranged therein, of a flexible connection extending from the top of said filtering tube or tubes to a stationary discharge-opening adapted to form a communication through the walls of said receptacle, and a discharge-tube connected to the stationary connection on the outside of said receptacle, said discharge-tube being extended below the bottom of said tubes, substantially as specified.

4. In a filter, the combination with a flexible collector having extended necks, as described, a series of filtering-tubes adapted to be connected into said necks, a stationary two-part connection arranged in a perforation in the walls of a retaining-receptacle in which said filtering-tubes are adapted to be placed, said two-part connection having a nipple to which said collector may be attached, and a flexible tube connected to said two-part connection on the outside of said receptacle and extended below the bottom of said filtering-tubes, substantially as specified.

5. In a filter, the combination with a suitable retaining-receptacle, of a series of filtering-tubes arranged therein, a collector having a series of openings one for each tube, flexible slip connections in each of said openings to which said tubes are adapted to be removably attached, and a discharge-pipe from said collector, said discharge-pipe being projected through the walls of said retaining-receptacle and extended below the bottom of said filtering-tubes, substantially as specified.

6. In a filter, the combination with an outer casing having an upper retaining-receptacle, and a lower reservoir therein, a series of filtering-tubes in said retaining-receptacle, and a collector having a series of openings one for each tube, a flexible rubber connection in each of said openings to which one of said tubes is removably attached, a discharge-tube from said collector, said discharge-tube being extended through the walls of said retaining-receptacle and into said reservoir, substantially as specified.

In witness whereof I have hereunto set my hand, this 24th day of May, 1892, in presence of two subscribing witnesses.

CHARLES EDOUARD CHAMBERLAND.

Witnesses:
ROBT. M. HOOPER,
R. H. BRANDON.